United States Patent
Ooba

(10) Patent No.: US 10,589,422 B2
(45) Date of Patent: Mar. 17, 2020

(54) ARTICLE CONVEYING APPARATUS

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 15/841,337

(22) Filed: Dec. 14, 2017

(65) Prior Publication Data

US 2018/0194005 A1 Jul. 12, 2018

(30) Foreign Application Priority Data

Jan. 11, 2017 (JP) .................................. 2017-002446

(51) Int. Cl.
*B25J 9/16* (2006.01)
*B25J 15/00* (2006.01)
*B25J 15/06* (2006.01)

(52) U.S. Cl.
CPC ........... *B25J 9/1664* (2013.01); *B25J 9/1612* (2013.01); *B25J 9/1694* (2013.01); *B25J 15/008* (2013.01); *B25J 15/0616* (2013.01)

(58) Field of Classification Search
CPC .... B25J 9/1664; B25J 15/008; B25J 15/0616; B25J 9/1694; B25J 9/1612
See application file for complete search history.

(56) References Cited

U.S. PATENT DOCUMENTS

| 5,446,835 | A | 8/1995 | Iida et al. |
| 2010/0004778 | A1 | 1/2010 | Arimatsu et al. |
| 2013/0103179 | A1* | 4/2013 | Miyoshi ................. B25J 9/1679 700/112 |
| 2014/0121836 | A1* | 5/2014 | Ban ........................ B25J 9/0093 700/259 |

(Continued)

FOREIGN PATENT DOCUMENTS

| CN | 101618544 A | 1/2010 |
| CN | 104044132 A | 9/2014 |

(Continued)

OTHER PUBLICATIONS

Office Action dated Aug. 7, 2018 in corresponding Japanese Patent Application No. 2017-002446; 6 pages including English-language translation.

(Continued)

*Primary Examiner* — Stephen Holwerda
(74) *Attorney, Agent, or Firm* — Maier & Maier, PLLC

(57) ABSTRACT

Provided is an article conveying apparatus including a three-dimensional sensor that measures a three-dimensional shape of an article; an adhering portion that is made to adhere to a surface of the article; a moving mechanism that moves a position of the adhering portion in a three-dimensional manner; and a control unit that controls the moving mechanism. The control unit is provided with a center-of-gravity calculating portion that calculates a center of gravity of the article on the basis of the three-dimensional shape of the article measured by the three-dimensional sensor and controls the moving mechanism so as to place the adhering portion in the vicinity of the center of gravity calculated by the center-of-gravity calculating portion.

4 Claims, 4 Drawing Sheets

(56) References Cited

U.S. PATENT DOCUMENTS

| | | |
|---|---|---|
| 2014/0195053 A1 | 7/2014 | Subotincic |
| 2014/0277694 A1 | 9/2014 | Ichimaru |
| 2014/0316573 A1 | 10/2014 | Iwatake |
| 2015/0124057 A1 | 5/2015 | Yamazaki |
| 2016/0229061 A1 | 8/2016 | Takizawa et al. |

FOREIGN PATENT DOCUMENTS

| | | |
|---|---|---|
| CN | 104108103 A | 10/2014 |
| CN | 105858188 A | 8/2016 |
| DE | 4236813 C2 | 6/2002 |
| DE | 102014005758 A1 | 10/2014 |
| DE | 102014016072 A1 | 7/2015 |
| DE | 102016000995 A1 | 8/2016 |
| EP | 2783810 A2 | 10/2014 |
| EP | 2658691 B1 | 9/2017 |
| GB | 2261069 A | 5/1993 |
| JP | H03-161223 A | 7/1991 |
| JP | H10-315167 A | 12/1998 |
| JP | 2007-319997 A | 12/2007 |
| JP | 2009-248214 A | 10/2009 |
| JP | 2010-005769 A | 1/2010 |
| JP | 2013-086229 A | 5/2013 |
| JP | 2013-154457 A | 8/2013 |
| JP | 2014-050936 A | 3/2014 |
| JP | 2015-136769 A | 7/2015 |
| JP | 2016-144841 A | 8/2016 |
| JP | 2016-219623 A | 12/2016 |

OTHER PUBLICATIONS

Search Report dated Jul. 6, 2018 in corresponding Japanese Patent Application No. 2017-002446; 15 pages including English-language translation.
Office Action dated Mar. 11, 2019 in corresponding Chinese Patent Application No. 201810016207.6; 12 pages.
Office Action dated Jun. 20, 2019, in corresponding Chinese Patent Application No. 201810016207.6; 12 pages.

* cited by examiner

ARTICLE CONVEYING APPARATUS

CROSS-REFERENCE TO RELATED APPLICATIONS

This application is based on Japanese Patent Application No. 2017-2446, the contents of which are incorporated herein by reference.

TECHNICAL FIELD

The present invention relates to an article conveying apparatus.

BACKGROUND

In the related art, there is a known robot system with which three-dimensional shapes of shallots that are randomly conveyed on a conveyor are measured by means of a three-dimensional sensor, and the position at which an adhesion pad attached to a distal end of a robot arm is made to adhere thereto is determined on the basis of the acquired three-dimensional shapes (for example, see Patent Literature 1).

The robot system of Patent Literature 1 is a system for cutting and removing root-hair portions and stem portions at two ends of bulb portions, which are the thickest portions of the shallots. With this robot system, in a state in which a bulb portion is adhered to the adhesion pad, the position at which the thickness is greatest in the three-dimensional shape for cutting the root-hair portion and the stem portion is identified as the bulb portion, and a site having a flat area equal to or greater than a predetermined area, in the vicinity of the identified bulb portion, is detected as an adhesion site.

SUMMARY OF INVENTION

An aspect of the present invention provides an article conveying apparatus including: a three-dimensional sensor that measures a three-dimensional shape of an article; an adhering portion that is made to adhere to a surface of the article; a moving mechanism that moves a position of the adhering portion in a three-dimensional manner; and a control unit that controls the moving mechanism, wherein the control unit is provided with a center-of-gravity calculating portion that calculates a center of gravity of the article on the basis of the three-dimensional shape of the article measured by the three-dimensional sensor and controls the moving mechanism so as to place the adhering portion in the vicinity of the center of gravity calculated by the center-of-gravity calculating portion.

DESCRIPTION OF EMBODIMENTS

An article conveying apparatus 1 according to a first embodiment of the present invention will be described below with reference to the drawings.

Figure 1:
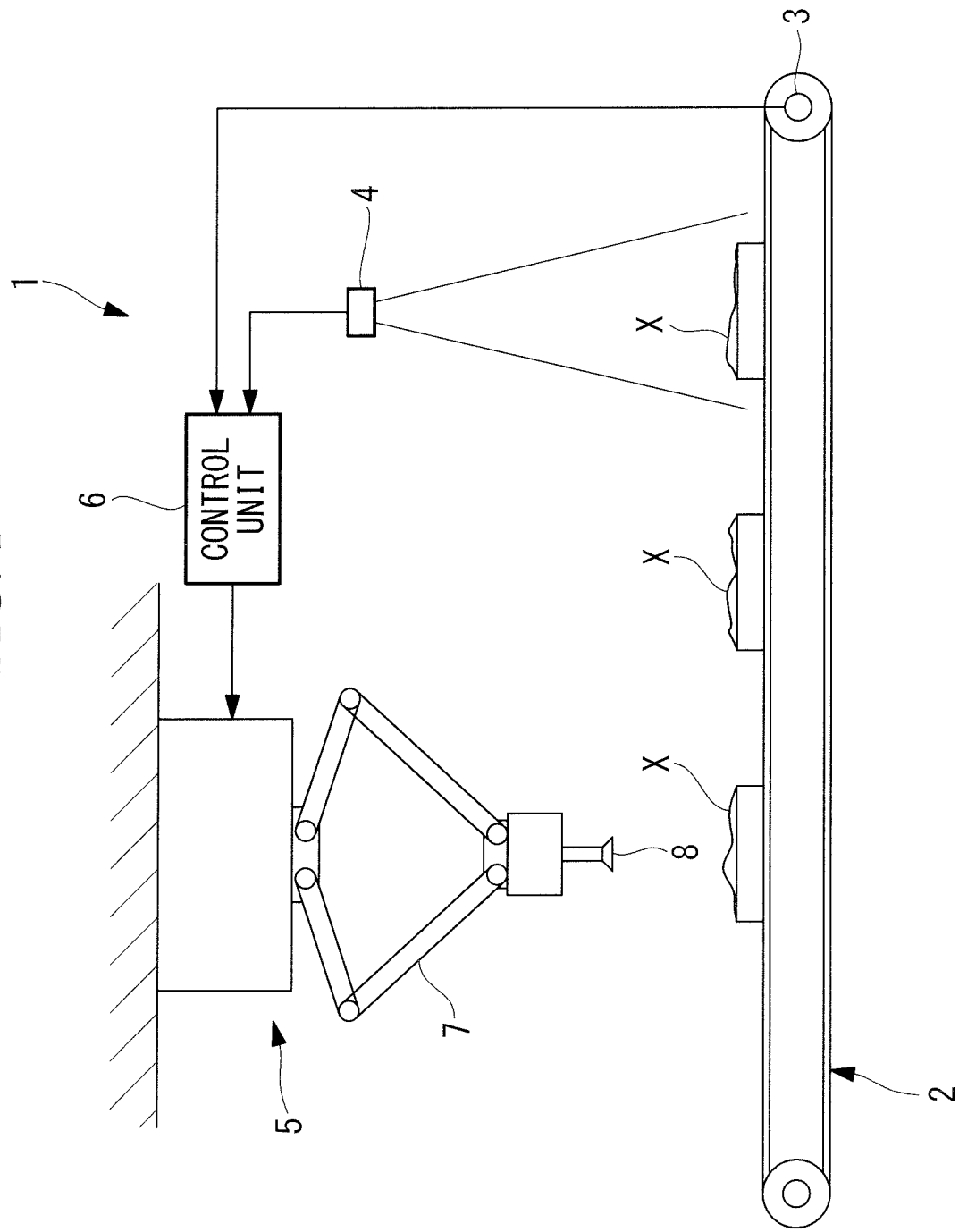
FIG. 1 is an overall configuration diagram showing an article conveying apparatus according to a first embodiment of the present invention.

As shown in FIG. 1, the article conveying apparatus 1 according to this embodiment is an apparatus with which an article X being conveyed on a conveyor 2 (first location) is lifted up by means of adhesion thereto and is conveyed to a conveying destination (second location). The conveyor 2 is provided with an encoder 3 so as to detect conveying-position information.

The article conveying apparatus 1 according to this embodiment is provided with: a three-dimensional sensor 4 that is disposed vertically above the conveyor 2 and that measures a three-dimensional shape of the article X being conveyed on the conveyor 2; a robot (adhering portion, moving mechanism) 5 that achieves adhesion to the article X and then conveying thereof; and a control unit 6 that controls the robot 5.

The article X is, for example, an article in which a food material having an undefined shape, for example, curry, stew, or the like, is accommodated in a flexible laminated bag, and, although the external shape of the laminated bag is maintained to some extent in a state in which the laminated bag is placed on the flat conveyor 2, the article X has an undefined shape in the thickness direction because the arrangement of solids, such as carrots, potato, and so forth, which are the contents of the bag, is not fixed.

Figure 2:
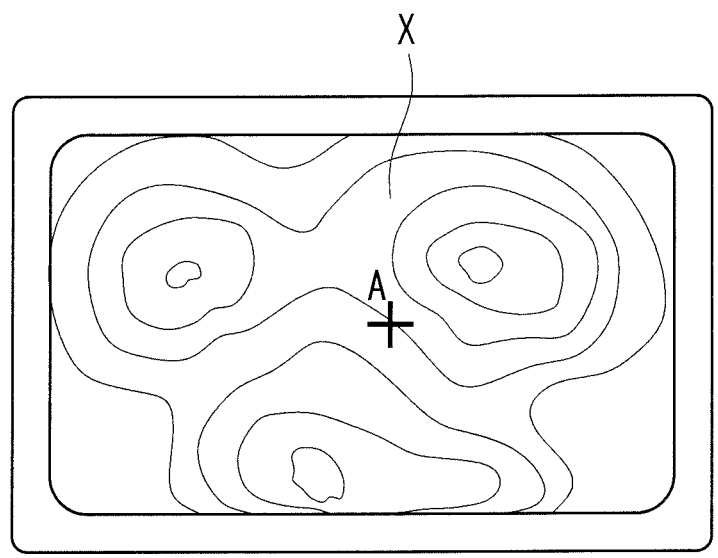
FIG. 2 is a plan view showing a three-dimensional shape and the center of gravity of an article measured by a three-dimensional sensor of the article conveying apparatus in FIG. 1.

As shown in FIG. 2, by measuring, with the three-dimensional sensor 4, the three-dimensional shape of the article X placed on the conveyor 2, information about the height distribution of the article X from a surface of the conveyor 2 is measured. In FIG. 2, lines drawn on the article X are contour lines.

The robot 5 is, for example, a suspended robot, disposed above the conveyor 2 further downstream from the three-dimensional sensor 4, and provided with an adhesion pad (adhering portion) 8 that faces vertically downward at a distal end of an arm (moving mechanism) 7 that can be moved to an arbitrary position in a three-dimensional manner within a predetermined movable range. By operating the robot 5, it is possible to move the adhesion pad 8 in a three-dimensional manner in a state in which the adhesion pad 8 remains facing vertically downward.

The adhesion pad 8 is provided with an adhesion surface that is constituted of a flexible material, such as rubber or the like, formed in a circular shape of a predetermined size, and that is made to adhere to the article X by being deformed so as to conform to a surface shape of the article X brought into contact therewith by decompressing the interior thereof in a state in which the adhesion surface is in close contact with the surface of the article X along the entire circumference thereof.

Figure 3:
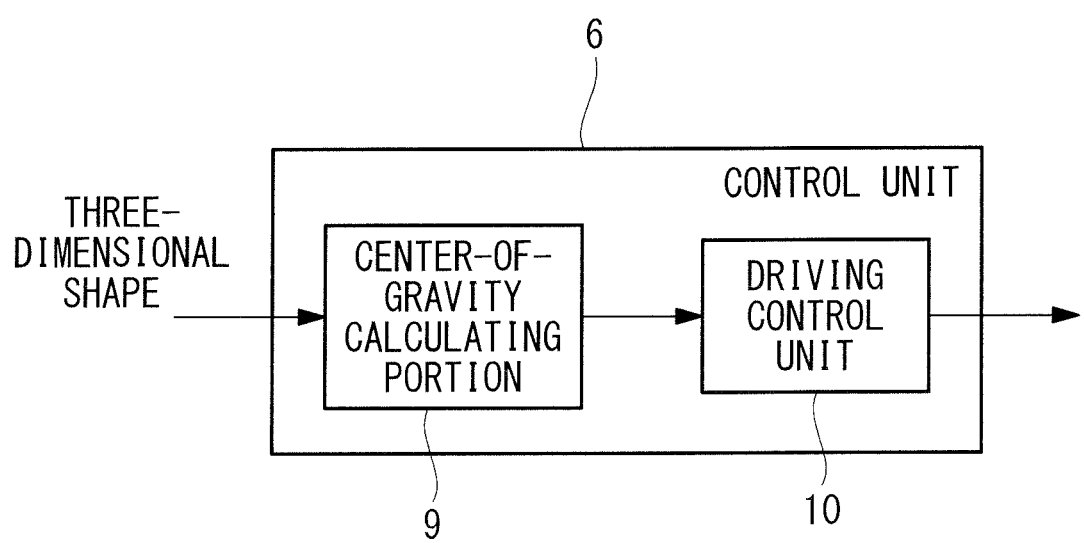
FIG. 3 is a block diagram showing a control unit of the article conveying apparatus in FIG. 1.

As shown in FIG. 3, the control unit 6 is provided with a center-of-gravity calculating portion 9 that calculates a center-of-weight position (center of gravity) of the article X on the basis of the three-dimensional shape of the article X measured by the three-dimensional sensor 4, and a driving control unit 10 that controls driving of the robot 5. The center-of-gravity calculating portion 9 calculates the center of gravity of the article X on the basis of the coordinates and height information at the individual positions in the article X by, for example, by assuming that the specific gravities of the laminated bag and the contents thereof constituting the article X are constant and assuming that the height distribution and the weight distribution thereof are equal to each other. In the example shown in FIG. 2, for example, the position indicated by reference sign A is calculated as the center of gravity.

On the basis of the conveying-position information from the conveyor 2 and the information about the center of gravity of the article X calculated by the center-of-gravity calculating portion 9, the driving control unit 10, while tracking the article X being conveyed by the conveyor 2, controls the robot 5 so as to make the adhesion pad 8 adhere to the article X by moving the adhesion pad 8 at the distal end of the arm 7 to the vicinity of the center of gravity of the article X.

The operation of the thus-configured article conveying apparatus 1 according to this embodiment will be described below.

With the article conveying apparatus 1 according to this embodiment, when the article X being conveyed by the conveyor 2 from upstream thereof passes vertically below the three-dimensional sensor 4, the three-dimensional sensor 4 measures the height distribution thereof from the surface of the conveyor 2 so as to serve as the three-dimensional shape thereof. The measured three-dimensional shape is transmitted to the control unit 6.

In the control unit 6, on the basis of the height-distribution information transmitted thereto, the center-of-gravity calculating portion 9 calculates the center of gravity of the article X. Then, the driving control unit 10 controls the robot 5 on the basis of the conveying-position information transmitted thereto from the encoder 3 of the conveyor 2 and the center-of-gravity information calculated by the center-of-gravity calculating portion 9, thus moving, while tracking the article X being conveyed by the conveyor 2, the adhesion pad 8 so that the adhesion pad 8 attached to the distal end of the arm 7 is brought into contact with the top surface of the article X at the center of gravity of the article X.

Then, at the point in time when the adhesion pad 8 comes into contact with the top surface of the article X, the driving control unit 10 activates the adhesion pad 8, thus causing the adhesion pad 8 to adhere to the article X. The driving control unit 10 causes the robot 5 to move so as to lift up the article X from the conveyor 2 and convey the article X to the conveying destination by raising the adhesion pad 8 in a state in which the article X is adhered thereto.

In this case, with the article conveying apparatus 1 according to this embodiment, the three-dimensional shape of the article X is measured by using the three-dimensional sensor 4, the weight position of the article X is calculated from the three-dimensional shape, and adhesion by means of the adhesion pad 8 is achieved in the vicinity of the calculated weight position (adhesion position); therefore, a good weight balance is achieved in the article X centered on the adhesion pad 8 when the article X is lifted up from the conveyor 2. Therefore, there is an advantage in that, even with an article X like a flexible laminated bag, it is possible to avoid a large change in the shape thereof when the article X is lifted up.

In other words, in the case in which adhesion is achieved at a position that is different from the center of gravity, a large change in the shape of the article X may occur because of an undesirable weight balance, and the adhered state may be lost due to an uneven load acting on the adhesion pad 8; however, with the article conveying apparatus 1 according to this embodiment, it is possible to prevent the occurrence of such problems.

As a result, there is an advantage in that, even if the article X is an article having an undefined shape or a flexible article, it is possible to convey the article X by more reliably maintaining the adhered state.

Note that, in this embodiment, an arbitrary reference position in the article X (for example, the center-of-weight position in the article X) may be set so as to serve as a reference, and the position at which the article X is to be placed at the conveying destination may be adjusted on the basis of the relationship between the set reference position and the position at which the adhesion pad 8 is made to adhere. In this case, the article conveying apparatus 1 is provided with a storage portion that stores the information about the adhesion position on the article X and the set reference position in association with each other. When moving the article X to the conveying destination from the conveyor 2, the control unit 6 controls the robot 5 on the basis of the relationship between the adhesion position and the reference position stored in the storage portion, thus adjusting the position at which the article X is placed at the conveying destination.

Next, an article conveying apparatus 11 according to a second embodiment of the present invention will be described below with reference to the drawings.

Figure 4:
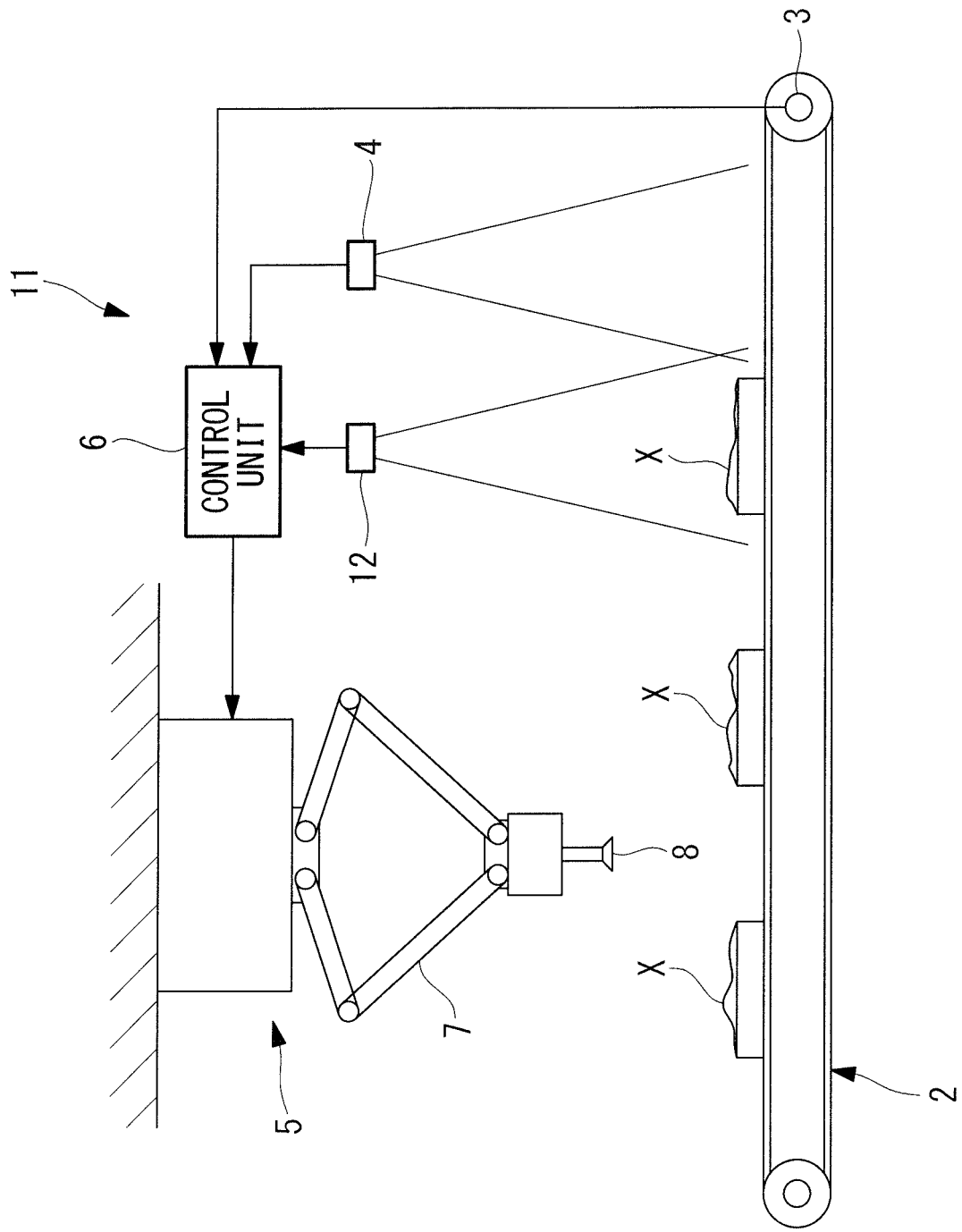
FIG. 4 is an overall configuration diagram showing an article conveying apparatus according to a second embodiment of the present invention.
Figure 5:
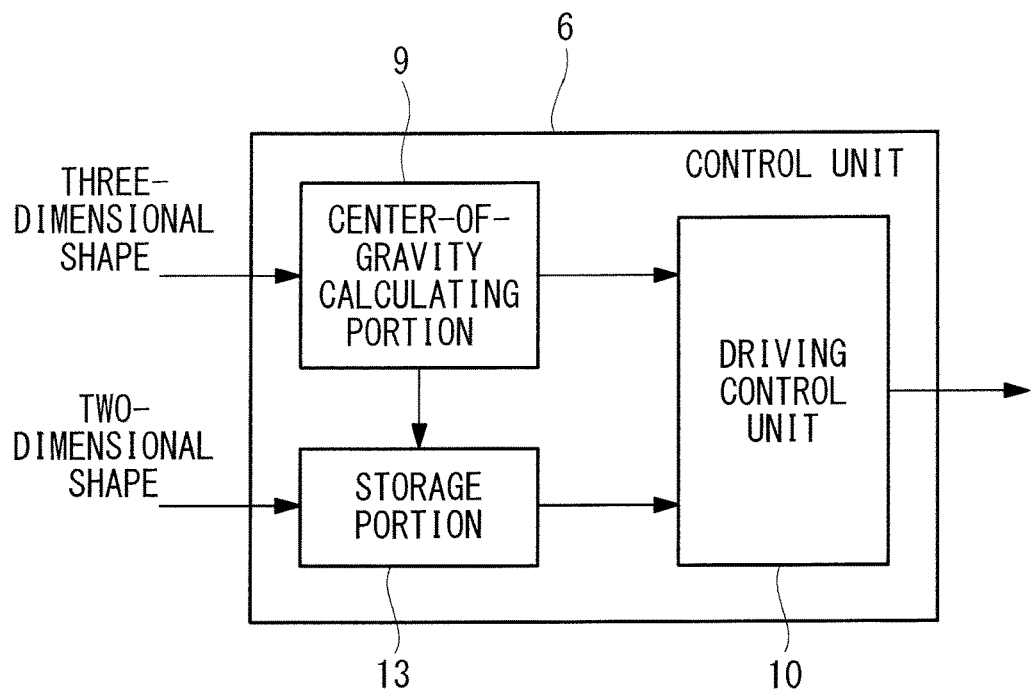
FIG. 5 is a block diagram showing a control unit of the article conveying apparatus in FIG. 4.

As shown in FIG. 4, the article conveying apparatus 11 according to this embodiment is additionally provided with a two-dimensional sensor 12 that is disposed above the conveyor 2 between the three-dimensional sensor 4 and the robot 5 and that measures the plan-view two-dimensional shape of the article X being conveyed by the conveyor 2. In addition, as shown in FIG. 5, the control unit 6 is provided with a storage portion 13 that stores information about the two-dimensional shape measured by the two-dimensional sensor 12 and the information about the center of gravity calculated by the center-of-gravity calculating portion 9 in association with each other.

Also, as with the article conveying apparatus 1 according to the first embodiment, the driving control unit 10 is configured so as to lift up, from the conveyor 2 (first location), the article X by making the adhesion pad 8 adhere to the article X in the vicinity of the calculated center of gravity thereof and so as to convey the article X to the conveying destination (second location).

In this case, in this embodiment, the driving control unit 10 reads out the center of gravity at which the adhesion pad 8 is made to adhere to the article X and the two-dimensional shape of the article X from the storage portion 13, and corrects the target position of the adhesion pad 8 at the conveying destination so that the article X is placed at a predetermined position and in a predetermined direction at the conveying destination.

An example will be described in terms of a case in which, in a program executed by the driving control unit 10, the target position of the adhesion pad 8 at the conveying destination is set at the center of gravity in the two-dimensional shape of the article X.

The center of gravity calculated by the center-of-gravity calculating portion 9 on the basis of the three-dimensional shape measured by the three-dimensional sensor 4 differs from the center of gravity in the two-dimensional shape depending on the weight distribution of the article X, thus generating a difference therebetween. Therefore, the driving control unit 10 corrects the target position of the adhesion pad 8 at the conveying destination by an amount equal to the difference between the center of gravity in the three-dimensional shape of the article X and the center of gravity in the two-dimensional shape of the article X.

As has been described above, with the article conveying apparatus 11 according to this embodiment, as with the article conveying apparatus 1 according to the first embodiment, the adhesion pad 8 is made to adhere to the article X in the vicinity of the center of the gravity in the three-dimensional shape thereof, and therefore, it is possible to achieve a good weight balance in the article X centered on the adhesion pad 8 when the article X is lifted up from the conveyor 2. Therefore, there is an advantage in that, even if the article X is an article having an undefined shape or a flexible article, it is possible to convey the article X by more reliably maintaining the adhesion state thereof.

Furthermore, with the article conveying apparatus 11 according to this embodiment, although the center of gravity is calculated for each article X and adhesion is achieved at different positions, because the relationship between the plan-view two-dimensional shape and the center of gravity of the article X is stored and the target position of the adhesion pad 8 when being moved to the conveying destination is corrected, it is possible to always place the article X at a predetermined position and in a predetermined direction at the conveying destination. As a result, there is an advantage in that it is possible to facilitate subsequent work to be performed at the conveying destination, for example, packing of the article X, wrapping thereof, and so forth.

Note that, although this embodiment has been described in terms of an example in which the three-dimensional sensor 4 and the two-dimensional sensor 12 are separately provided, alternatively, a single sensor that can measure both two-dimensional shape and three-dimensional shape may be employed. In addition, the two-dimensional sensor 12 may be disposed above the conveyor 2 upstream of the three-dimensional sensor 4.

Figure 6:
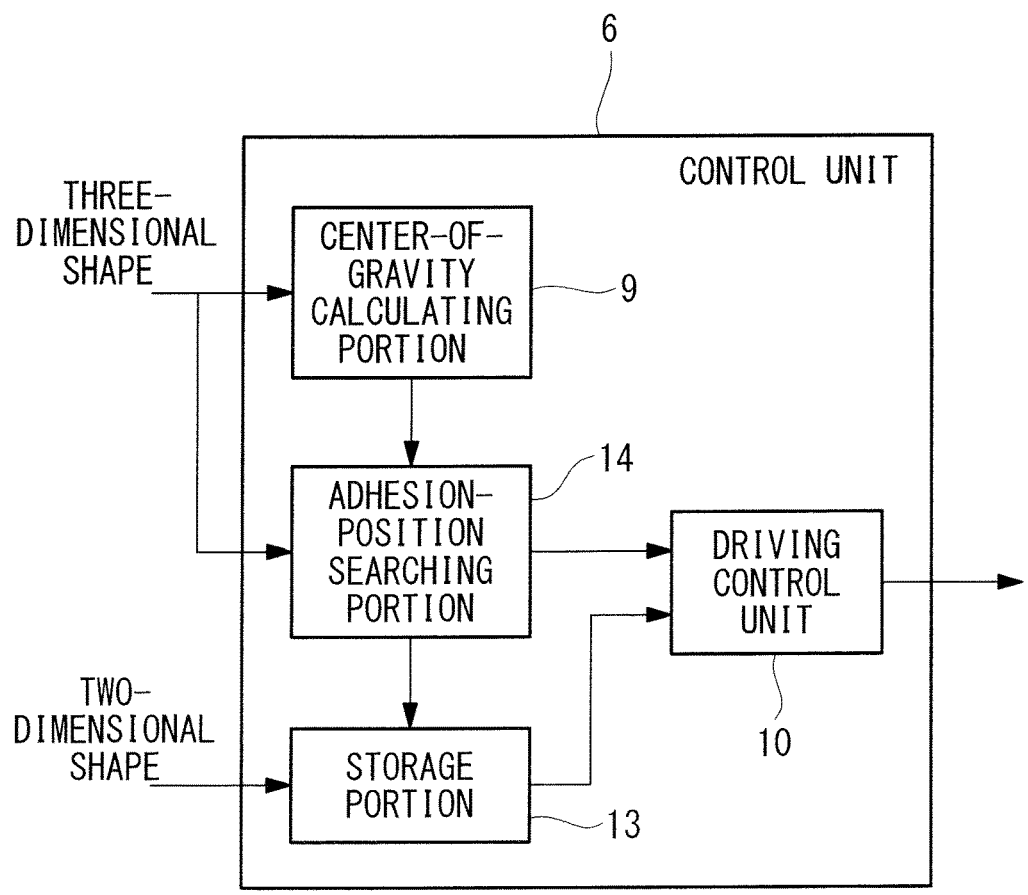
FIG. 6 is a block diagram showing a modification of the control unit of the article conveying apparatus in FIG. 5.

In addition, in the individual embodiments described above, the adhesion pad 8 is made to adhere to the center of gravity calculated by the center-of-gravity calculating portion 9; instead of this, however, as shown in FIG. 6, the control unit 6 may be provided with an adhesion-site searching portion (adhesion-position searching portion) 14, a flat portion having a size that encompasses the adhesion surface of the adhesion pad 8 (that is equal to or greater than the area required to achieve adhesion) may be searched for in the vicinity of the center of gravity, and the robot 5 may be controlled so as to move the adhesion pad 8 to the position aligned with the detected flat portion. For example, in the case in which the adhesion pad 8 is circular, a circular flat portion that is larger than the outer diameter of the adhesion pad 8 may be searched for, and the target position of the adhesion pad 8 at the destination to which the adhesion pad 8 is moved should be set at the center of the flat portion.

By doing so, even in the case in which the surface of the article X in the vicinity of the calculated center of gravity is not flat, it is possible to achieve adhesion to the flat portion in close proximity to the center of gravity, and thus, it is possible to make the adhesion pad 8 more reliably adhere to the article.

In addition, in the case in which a plurality of flat portions are detected as a result of the search performed by the adhesion-site searching portion 14, the robot 5 may be controlled so as to move the adhesion pad 8 to a flat portion that is closest to the center of gravity.

In addition, in the case in which the position at which the adhesion pad 8 is made to adhere is set to a flat portion disposed at a position that is different from the thus-calculated center of gravity, the two-dimensional shape and the adhesion position may be stored in the storage portion 13 in association with each other.

In addition, in the case in which a flat portion is not detected in a predetermined region in the vicinity of the center of gravity, a notice indicating an error may be issued.

In addition, although the above-described individual embodiments have been described in terms of examples in which the single adhesion pad 8 is made to adhere to the article X, a plurality of adhesion pads 8 may be made to adhere to the article X.

In this case, the adhesion-site searching portion 14 of the control unit 6 searches, in the vicinity of the center of gravity, for a plurality of flat portions each of which has a size that encompasses the adhesion surface of a single adhesion pad 8 and that are positioned at substantially the same heights at which at least two adhesion pads 8 can be made to adhere thereto. Then, the control unit 6 controls the robot 5 on the basis of the search result so as to move the individual adhesion pads 8 to positions aligned with the individual detected flat portions, and thus, the plurality of adhesion pads 8 are made to adhere to the article X.

In addition, although the above-described individual embodiments have been described in terms of examples in which a suspended robot is employed as the robot 5, alternatively, another type of robot (for example, an upright multijoint robot, a SCARA robot, a gantry robot, or the like) may be employed From the above-described embodiments and modifications thereof, the following aspects of the invention are derived.

An aspect of the present invention provides an article conveying apparatus including: a three-dimensional sensor that measures a three-dimensional shape of an article; an adhering portion that is made to adhere to a surface of the article; a moving mechanism that moves a position of the adhering portion in a three-dimensional manner; and a control unit that controls the moving mechanism, wherein the control unit is provided with a center-of-gravity calculating portion that calculates a center of gravity of the article on the basis of the three-dimensional shape of the article measured by the three-dimensional sensor and controls the moving mechanism so as to place the adhering portion in the vicinity of the center of gravity calculated by the center-of-gravity calculating portion.

With this aspect, when the three-dimensional sensor measures the three-dimensional shape of the article, the center of gravity of the article is calculated by the center-of-gravity calculating portion of the control unit on the basis of the measured three-dimensional shape of the article, and the moving mechanism is controlled so as to place the adhering portion in the vicinity of the calculated center of gravity. By achieving adhesion to the article by activating the adhering portion in this state, it is possible to apply a lifting force to the article at a position at which a good weight balance is achieved. As a result, even if the article is an article having an undefined shape or a flexible article, it is possible to convey the article by more reliably maintaining the adhered state.

In the above-described aspect, the control unit may be provided with an adhesion-site searching portion that searches, in the vicinity of the center of gravity calculated by the center-of-gravity calculating portion on the basis of the three-dimensional shape of the article measured by the three-dimensional sensor, for a flat portion that has an area that is equal to or greater than an area needed to make the adhering portion adhere thereto, and wherein the control unit may control the moving mechanism so that the adhering portion is aligned with the flat portion searched for by the adhesion-site searching portion.

By doing so, it is possible to make the adhering portion adhere to the flat portion searched for by the adhesion-site searching portion in the vicinity of the center of gravity. By doing so, by making the initially achieved adhered state more reliable, it is possible to make the adhered state less likely to be lost even if the shape of the article is changed when being lifted up, and thus, it is possible to more reliably convey the article.

In the above-described aspect, in the case in which more than one of the flat portions searched for by the control unit are present, the control unit may control the moving mechanism so that the adhering portion is aligned with the flat portion that is closest to the center of gravity.

By doing so, among the flat portions searched for by the adhesion-site searching portion, it is possible to make the adhering portion adhere to the flat portion that is closest to the center of gravity. By doing so, by making the adhered state achieved for the first time more reliable and by achieving a state in which a better weight balance is achieved, it is possible to make the adhered state less likely to be lost even if the shape of the article is changed when being lifted up, and thus, it is possible to more reliably convey the article.

The above-described aspect may be provided with a storage portion that stores a position at which the adhering portion is made to adhere to the article and an arbitrary reference position in the article in association with each other, wherein, when controlling the moving mechanism so as to move, to a second location, the article to which the adhering portion is made to adhere at a first location, the control unit may correct, on the basis of the relationship between the reference position and the adhesion position stored in the storing portion, a position to which the adhering portion is moved.

For example, when the center of gravity is changed due to a state of contents of the article having an external shape that is fixed to some extent, such as a laminated bag, the adhering portion is made to adhere to different positions on the external shapes of the individual articles. In such a case, by storing, in association with each other, the position to which the adhering portion is made to adhere and the arbitrary reference position in the article in the storage portion, when moving, to the second location, the article to which the adhering portion is made to adhere at the first location, it is possible to easily calculate the position to which the adhering portion is to be moved in order to place the article at a predetermined position at the second location.

The above-described aspect, may be provided with: a two-dimensional sensor that measures a plan-view two-dimensional shape of the article; and a storage portion that stores, in association with each other, the plan-view two-dimensional shape of the article measured by the two-dimensional sensor and a position at which the adhering portion is made to adhere to the article, wherein, when controlling the moving mechanism so as to move, to a second location, the article to which the adhering portion is made to adhere at a first location, the control unit may correct, on the basis of the relationship between the two-dimensional shape and the adhesion position of the article stored in the storing portion, a position to which the adhering portion is moved.

When the center of gravity is changed due to a state of contents of the article having an external shape that is fixed to some extent, such as a laminated bag, the adhering portion is made to adhere to different positions on the external shapes of the individual articles. In such a case, by measuring the plan-view two-dimensional shape of the article by using the two-dimensional sensor and by storing, in association with each other, the position to which the adhering portion is made to adhere and the two-dimensional shape in the storage portion, when moving, to the second location, the article to which the adhering portion is made to adhere at the first location, it is possible to easily calculate the position to which the adhering portion is to be moved in order to place the article at a predetermined position at the second location.

By doing so, it is possible to convey the article to a certain position at the second location at a conveying destination even if the adhesion position differs depending on the state of the article at the first location at a conveying origin, and thus, it is possible to facilitate subsequent work to be performed at the second location, for example, packing of the article, wrapping thereof, and so forth.

REFERENCE SIGNS LIST 1, 11 article conveying apparatus
2 conveyor (first location)
4 three-dimensional sensor
5 robot (moving mechanism)
6 control unit
7 arm (moving mechanism)
8 adhesion pad (adhering portion)
9 center-of-gravity calculating portion
12 two-dimensional sensor
13 storage portion
14 adhesion-site searching portion
A center of gravity
X article

The invention claimed is:

1. An article conveying apparatus comprising:
  a three-dimensional sensor that measures a three-dimensional shape of an article having an undefined shape or flexible article sequentially conveyed on a conveyor;
  an adhering pad that adheres to a surface of the article while tracking the article being conveyed on a conveyor;
  an arm that is configured to move a position of the adhering pad in a three-dimensional manner; and
  a controller that is configured to control the arm,
  wherein the controller is provided with a center-of-gravity calculator that is configured to calculate a center of gravity of the entire article on the basis of the three-dimensional shape of the article measured by the three-dimensional sensor and an adhesion-site searching portion that is configured to search, in the vicinity of the center of gravity calculated by the center-of-gravity calculator, for a flat portion that has an area that is equal to or greater than an area needed to make the adhering pad adhere thereto, and wherein the controller controls the arm so that the adhering pad is aligned with the flat portion searched for by the adhesion-site searching portion.

2. An article conveying apparatus according to claim 1, wherein, in the case in which more than one of the flat portions searched for by the controller are present, the controller controls the arm so that the adhering pad is aligned with the flat portion that is closest to the center of gravity.

3. An article conveying apparatus comprising:
  a three-dimensional sensor that measures a three-dimensional shape of an article having an undefined shape or flexible article sequentially conveyed on a conveyor;

an adhering pad that adheres to a surface of the article while tracking the article being conveyed on a conveyor;

an arm that is configured to move a position of the adhering pad in a three-dimensional manner; and a controller that is configured to control the arm, a storage that is configured to store a position at which the adhering pad is made to adhere to the article and an arbitrary reference position in the article in association with each other, wherein the controller is provided with a center-of-gravity calculator that is configured to calculate a center of gravity of the entire article on the basis of the three-dimensional shape of the article measured by the three-dimensional sensor, and controls the arm so as to place the adhering pad in the vicinity of the center of gravity calculated by the center-of-gravity calculator, and wherein, when controlling the arm so as to move, to a second location, the article to which the adhering pad is made to adhere at a first location, the controller corrects, on the basis of the relationship between the reference position and the adhesion position stored in the storage, a position to which the adhering pad is moved.

4. An article conveying apparatus comprising:

a three-dimensional sensor that measures a three-dimensional shape of an article having an undefined shape or flexible article sequentially conveyed on a conveyor;

an adhering pad that adheres to a surface of the article while tracking the article being conveyed on a conveyor;

an arm that is configured to move a position of the adhering pad in a three-dimensional manner; and a controller that is configured to control the arm, a two-dimensional sensor that measures a plan-view two-dimensional shape of the article; and a storage that is configured to store, in association with each other, the plan-view two-dimensional shape of the article measured by the two-dimensional sensor and a position at which the adhering pad is made to adhere to the article, wherein the controller is provided with a center-of-gravity calculator that is configured to calculate a center of gravity of the entire article on the basis of the three-dimensional shape of the article measured by the three-dimensional sensor, and controls the arm so as to place the adhering pad in the vicinity of the center of gravity calculated by the center-of-gravity calculator, and wherein, when controlling the arm so as to move, to a second location, the article to which the adhering pad is made to adhere at a first location, the controller corrects, on the basis of the relationship between the two-dimensional shape and the adhesion position of the article stored in the storage, a position to which the adhering pad is moved.

* * * * *